United States Patent
Spenninger et al.

(10) Patent No.: US 12,263,575 B2
(45) Date of Patent: Apr. 1, 2025

(54) METHOD FOR SPECIFYING AN INPUT VALUE ON A ROBOTIC MANIPULATOR

(71) Applicant: FRANKA EMIKA GMBH, Munich (DE)

(72) Inventors: Andreas Spenninger, Karlsfeld (DE); Saskia Golz, Munich (DE); Sven Parusel, Munich (DE)

(73) Assignee: Franka Emika GmbH, Munich (DE)

( * ) Notice: Subject to any disclaimer, the term of this patent is extended or adjusted under 35 U.S.C. 154(b) by 167 days.

(21) Appl. No.: 17/620,788

(22) PCT Filed: Jun. 26, 2020

(86) PCT No.: PCT/EP2020/067984
§ 371 (c)(1),
(2) Date: Dec. 20, 2021

(87) PCT Pub. No.: WO2020/260556
PCT Pub. Date: Dec. 30, 2020

(65) Prior Publication Data
US 2022/0355489 A1   Nov. 10, 2022

(30) Foreign Application Priority Data
Jun. 26, 2019   (DE) ..................... 10 2019 117 217.9

(51) Int. Cl.
*B25J 18/00*   (2006.01)
*B25J 13/02*   (2006.01)
(Continued)

(52) U.S. Cl.
CPC ................. *B25J 13/02* (2013.01); *G06F 3/02* (2013.01); *G06F 3/0338* (2013.01); *G06F 3/0362* (2013.01)

(58) Field of Classification Search
CPC .......... B25J 13/02; B25J 9/1671; B25J 9/161; G06F 3/02; G06F 3/0338; G06F 3/0362;
(Continued)

(56) References Cited

U.S. PATENT DOCUMENTS

2013/0255426 A1*  10/2013  Kassow ............... B25J 19/0004
                                                                  901/23
2014/0114464 A1    4/2014   Williams et al.
(Continued)

FOREIGN PATENT DOCUMENTS

| DE | 102012106448 A1 | 3/2014 |
|----|-----------------|--------|
| DE | 212013000218 U1 | 9/2015 |

(Continued)

OTHER PUBLICATIONS

English translation of International Preliminary Report on Patentability issued in International Application No. PCT/EP2020/067984 on Jan. 6, 2022.

(Continued)

*Primary Examiner* — Masud Ahmed
(74) *Attorney, Agent, or Firm* — Hoffmann & Baron, LLP

(57) ABSTRACT

A method of specifying an input value on a robotic manipulator, wherein the method includes: selecting a particular predefined input device to be emulated, wherein the input device to be emulated is assigned at least one degree of freedom of the robotic manipulator and local limits in the at least one degree of freedom, and a transfer function of a coordinate of the robotic manipulator in the at least one degree of freedom is assigned onto the input value; actuating the robotic manipulator such that at least one part of the robotic manipulator is manually movable in the at least one degree of freedom and within the local limits; recording a respective coordinate in the at least one degree of freedom during or after completion of an input on the robotic (Continued)

manipulator via a sensor unit; and applying the transfer function to assign the respective coordinate to the input value.

18 Claims, 2 Drawing Sheets

(51) Int. Cl.
    *G06F 3/02* (2006.01)
    *G06F 3/0338* (2013.01)
    *G06F 3/0362* (2013.01)
(58) Field of Classification Search
    CPC .. G06F 3/0481; G06F 3/04847; G05B 19/423
    See application file for complete search history.

(56) References Cited

U.S. PATENT DOCUMENTS

| | | | |
|---|---|---|---|
| 2015/0130794 A1 | 5/2015 | Katsuda | |
| 2015/0174767 A1 | 6/2015 | Som | |
| 2016/0271792 A1 | 9/2016 | Yui et al. | |
| 2018/0080841 A1* | 3/2018 | Cordoba | A61B 34/35 |
| 2018/0194010 A1* | 7/2018 | Huang | G01B 21/042 |
| 2018/0200880 A1 | 7/2018 | Meissner et al. | |
| 2018/0235724 A1 | 8/2018 | Nowatschin et al. | |
| 2018/0345484 A1* | 12/2018 | Miyamoto | B25J 9/0081 |
| 2018/0345506 A1 | 12/2018 | Riedel | |
| 2019/0160686 A1 | 5/2019 | Riedel | |
| 2019/0202066 A1* | 7/2019 | Maret | B25J 17/025 |
| 2019/0270206 A1 | 9/2019 | Maier | |
| 2019/0358817 A1* | 11/2019 | Ghazaei Ardakani | B25J 9/1689 |
| 2020/0206924 A1* | 7/2020 | Pivac | B25J 9/1674 |
| 2020/0316779 A1* | 10/2020 | Truebenbach | B25J 9/1692 |
| 2022/0355489 A1* | 11/2022 | Spenninger | G05B 19/423 |
| 2022/0362943 A1* | 11/2022 | Spenninger | G05B 19/423 |
| 2023/0302658 A1* | 9/2023 | Meyer | A61B 34/30 |

FOREIGN PATENT DOCUMENTS

| | | |
|---|---|---|
| DE | 102015009151 A1 | 1/2017 |
| DE | 202015008715 U1 | 4/2017 |
| DE | 102016208811 B3 | 10/2017 |
| DE | 102017202439 A1 | 8/2018 |
| JP | 2016-175178 A | 10/2016 |
| WO | WO 2014/005607 A1 | 1/2014 |
| WO | WO 2018/049448 A2 | 3/2018 |

OTHER PUBLICATIONS

Japanese Office Action dated Dec. 3, 2024 with English translation.

* cited by examiner

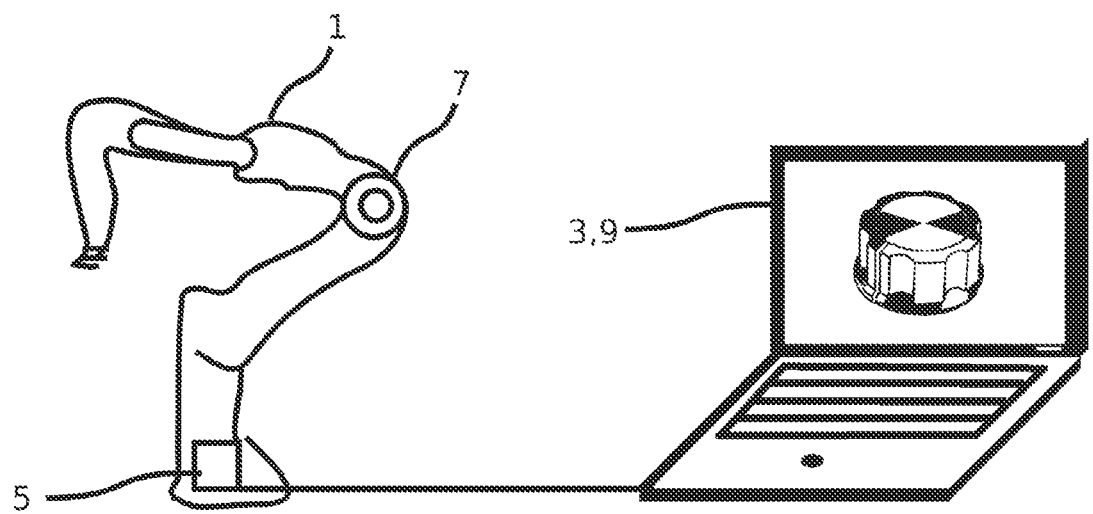
Fig. 1
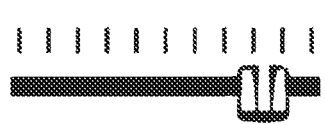 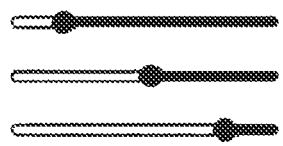
Fig. 2A            Fig. 2B
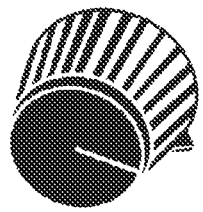
Fig. 2C

METHOD FOR SPECIFYING AN INPUT VALUE ON A ROBOTIC MANIPULATOR

CROSS-REFERENCE TO RELATED APPLICATIONS

The present application is the U.S. National Phase of PCT/EP2020/067984, filed on 26 Jun. 2020, which claims priority to German Patent Application No. 10 2019 117 217.9, filed on 26 Jun. 2019, the entire contents of which are incorporated herein by reference.

FIELD

The invention relates to a method of specifying an input value on a robotic manipulator, and to a robotic manipulator configured and implemented to carry out the method.

SUMMARY

The aim of the invention is to design more intuitively and to simplify the specification, on the part of the user, of the input value for the robotic manipulator.

The invention results from the features of the independent claims. Advantageous developments and designs are the subject matter of the dependent claims.

A first aspect of the invention relates to a method for specifying an input value on a robotic manipulator, wherein the robotic manipulator comprises a plurality of limbs connected to one another by articulations and movable with respect to one another by actuation, wherein the method includes:
 selecting a particular input device to be emulated from a plurality of predefined input devices by specification of a user or by a control unit of the robotic manipulator, wherein each of the plurality of input devices to be emulated is assigned at least one degree of freedom of the robotic manipulator and local limits in the at least one degree of freedom, and a transfer function of a coordinate of the robotic manipulator in the at least one degree of freedom is assigned onto the input value;
 actuating the robotic manipulator in such a manner that at least one part of the robotic manipulator is manually movable by a user in the at least one degree of freedom assigned to the particular input device selected to be emulated and within the local limits assigned to the particular input device selected to be emulated;
 recording a respective coordinate in the at least one degree of freedom during or after completion of an input, the input performed by manual guiding of a user, on the robotic manipulator via at least one sensor unit connected to the robotic manipulator; and
 applying the transfer function to assign the respective coordinate to the input value.

The input value is, in particular, a parameter of a control program executed later by the robotic manipulator. For example, the parameter relates to a speed, in particular, a specification of a speed, or to a force, in particular, a specification of a force, to a limit value, or to a controller parameter, such as an amplification, or to a bandwidth of a controller of the robotic manipulator.

The input devices are virtual physically existing devices on which at least one input value can be specified by a user. Data on the predefined input devices to be emulated are preferably stored in a memory of the robotic manipulator. In general, input devices are used in many areas of human-machine interfaces, in vehicles, work machines, household appliances, or also in robotic manipulators. The analogue physically existing input devices therefore include material structures which, in particular, can be moved relative to one another, as in the case of a switch, a toggle switch, a rotary switch, a sliding controller, a lever, or the like. Each of these physically existing devices is limited to particular degrees of freedom; for example, a conventional rotary switch can be rotated only about a vertical axis, wherein a current angle of the rotary switch with respect to a housing or a support of a rotary switch corresponds to specified values. According to the invention, the robotic manipulator is then actuated, and sensor data of a sensor unit are read, so that a current position of the robotic manipulator corresponds to such a particular specified value, as if it had been applied on a physically existing rotary switch. The position of the robotic manipulator relates, in particular, both to a translational position coordinate or position vector and also, under some circumstances, to a particular angle which two limbs of the robotic manipulator assume with respect to one another. Thus, preferably, a rotation angle of the end effector, which is arranged on a distal end of the robotic manipulator, with respect to the limb of the robotic manipulator on which the end effector is arranged, is converted into an associated angle of a virtual rotary switch, wherein, advantageously for the user, the resulting impression is as if the end effector were in fact the really existing rotary switch.

Accordingly, an input device is emulated, in that, on the robotic manipulator, a similar movement by the user can occur, as if the user were interacting with the physical equivalent of the virtual input device. An additional example is a sliding controller emulated by the robotic manipulator, in which the robotic manipulator, or a selected point on the robotic manipulator, in particular, the end effector of the robotic manipulator, can be manually guided by the user only over a predefined distance on a line in space.

Correspondingly, the actuation of the robotic manipulator occurs, wherein the robotic manipulator includes limbs connected to one another by articulations. In particular, on the articulations, actuators are arranged, preferably using a transmission designed to move the limbs with respect to one another. Thus, the actuators can also be used to block particular degrees of freedom and enable other degrees of freedom, wherein the term degrees of freedom in the sense of the invention is to be understood as any directions or curves in which a specified point on the robotic manipulator can move. Thus, for example, a three-dimensional curve which can also be achieved, for example, simply by releasing only a single articulation, can be referred to as a degree of freedom. In the latter case, the actuators even ensure that all except for precisely two limbs arranged on an articulation are blocked against a movement induced by manual guiding by the user.

The sensor unit connected to the robotic manipulator preferably includes all the articulation angle sensors in the articulations of the robotic manipulator, so that, thereby, the position of the end effector with respect to a terrestrial reference system preferably in the Cartesian space can always be determined. Alternatively, the sensor unit connected to the robotic manipulator is preferably a camera system or a movement recording system, the individual sensor elements of which are arranged around the robotic manipulator in order to record from outside a position or a particular angle of the robotic manipulator. Thus, it is possible to record a coordinate of the robotic manipulator in the selected degree of freedom.

Using the specified transfer function, this recorded coordinate can be converted into an associated input value, wherein preferably, via a linear scale, the coordinate in the degree of freedom of the robotic manipulator is converted into this input value. Advantageously, scales which are a best fit for the current application can be defined. Nonlinear scales are also possible, so that, in particular, a logarithmic scale is advantageous when the focus of interest is more on the orders of magnitude of an input value than on the actual exact numerical value.

Here, the local limits correspond to the mechanical limits of the virtual physically existing input device, wherein, for example, a sliding controller has a left end and a right end, and a rotary controller, for example, has a lower limit in counterclockwise rotation and an upper limit in clockwise rotation. The local limits are artificially generated on the robotic manipulator by corresponding actuation of the actuators of the robotic manipulator. Accordingly, a counter momentum against the force applied by the user onto the robotic manipulator is generated so that the robotic manipulator can no longer be moved further beyond these limits by manual guiding.

If the recording of the respective coordinate in the respective degree of freedom occurs, after completion of the input, performed by manual guiding of a user, on the robotic manipulator by way of the at least one sensor unit connected to the robotic manipulator, then only the value of the coordinate which is present at the end of the manual guiding on the part of the user is recorded. To that extent, not a complete time series of coordinates, but rather only the end value is recorded and correspondingly documented over the course of the guiding on the part of the user. When this end value is present, it is advantageously automatically determined, in particular, in that it is recorded that speed due to manual guiding is no longer present on the robotic manipulator.

The assigning of the respective input device to be emulated to the respective degree of freedom of the robotic manipulator and to the local limits in the respective degree of freedom and to the transfer function is preferably predefined; alternatively, this assigning can also occur upon specification of the user.

It is an advantageous effect of the invention that, for a user, the behavior of a plurality of possible physical input devices is available. Thus, the input device which can be emulated is the one which is best suited for the current situation or the existing task, in order to make it possible for the user to intuitively specify the input value. In particular, if universally known input devices such as sliding controllers and rotary controllers are used, then the robotic manipulator can without difficulty simulate the behavior of such a desired input device and make it possible for the user to intuitively specify the input value. Moreover, the robotic manipulator advantageously does not need a physically present implementation of such a respective input device and can therefore be designed more simply and cost effectively.

According to an advantageous embodiment, the actuation of the robotic manipulator occurs in such a manner that all the remaining parts of the robotic manipulator are blocked against manual guiding on the part of the user.

According to this embodiment, exactly one single degree of freedom of the robotic manipulator is enabled, and all the remaining possibilities for the movement of the robotic manipulator are inhibited. In particular, if the degree of freedom is a straight line distance in space, wherein the straight line distance can be defined independently of the current articulation angles of the robotic manipulator, then the robotic manipulator, in particular, a selected point on this robotic manipulator, can be moved only on this straight line distance in space, wherein no other movements of the robotic manipulator by manual guiding on the part of the user are allowed. Advantageously, the user is given an unequivocal and intuitively comprehensible movement possibility for the robotic manipulator.

According to an additional advantageous embodiment, the actuation of the robotic manipulator occurs in such a manner that at least a subset of the remaining parts of the robotic manipulator is enabled for the manual guiding on the part of the user.

According to this embodiment, additional movement possibilities for the robotic manipulator can be allowed, in particular, if no couplings or disturbances occur during manual guiding in the degree of freedom of the robotic manipulator with respect to the additional movement possibilities, for example, if, on the end effector, the specification of the input value occurs, while the remaining articulations of the robotic manipulator are actuated preferably only with gravity compensation. Advantageously, this embodiment results in greater comfort for the user, since he/she can still use other non-blocked movement possibilities on the robotic manipulator.

According to an additional advantageous embodiment, the actuation of the robotic manipulator occurs in such a manner that the at least one part of the robotic manipulator in the respective degree of freedom outputs a haptic feedback, wherein the haptic feedback is a resistance, wherein the resistance varies over the distance of the manual guiding, with respect to the force of the user during the manual guiding of the robotic manipulator.

The haptic feedback preferably is a resistance force which increases with increasing value of the coordinate in the degree of freedom of the robotic manipulator or else a periodically occurring resistance force, so that advantageously a haptic grid is generated by the robotic manipulator, wherein the user receives a haptic feedback at the level of the specified input value, in particular, if only periodic multiples of values are of interest.

According to an additional advantageous embodiment, the resistance has a local minimum where the current coordinate in the respective degree of freedom of the robotic manipulator coincides with a whole number of the result of applying the transfer function.

Advantageously, via this embodiment, an input of numbers with decimals is avoided, in particular, if the haptic feedback of the robotic manipulator applies a force such that, when the robotic manipulator is released, a predetermined point on the robotic manipulator is moved back, preferably damped, by the counterforce of the robotic manipulator, which generates the haptic feedback, into such a local minimum.

According to an additional advantageous embodiment, the method moreover includes:

continuously recording the respective coordinate in the degree of freedom during the input, performed by manual guiding on the part of a user, on the robotic manipulator via the at least one sensor unit connected to the robotic manipulator, and outputting the input value on an optical output unit in synchronization with continuous recording of the respective coordinate.

The optical output unit is preferably a screen connected to the robotic manipulator, on which the virtual physical input device is displayed, wherein the display occurs in such a manner that the virtual physical input device in its currently displayed version is shown in such a state as if the current input value were actually present on the physical input device. Advantageously, the user is therefore provided with easily understandable feedback regarding first of all what the input device to be emulated actually looks like, wherein the user is able to intuitively derive particular properties in the movement, and the user is advantageously provided with feedback as to the order of magnitude or the approximation or else the exact value at which the current input value would currently be and thus be specified.

According to an additional advantageous embodiment, the input device to be emulated is one of the following: sliding controller, rotary controller, joystick, or push button.

According to an additional advantageous embodiment, the selection of the input device to be emulated occurs by performing and recording a haptic gesture performed by the user on the robotic manipulator and, in particular, furthermore by assigning the recorded gesture to one of a plurality of stored gestures.

According to an additional advantageous embodiment, the selection of the input device to be emulated occurs by recording an input entered by the user on a touch-sensitive screen, wherein the touch-sensitive screen is arranged on the robotic manipulator or on a gripper arranged on the robotic manipulator.

An additional aspect of the invention relates to a robotic manipulator, wherein the robotic manipulator comprises a plurality of limbs connected to one another by articulations and movable with respect to one another by actuation, the robotic manipulator including:
  a specification element configured to select a particular input device to be emulated from a plurality of predefined input devices, wherein each of the plurality of input devices to be emulated is assigned at least one degree of freedom of the robotic manipulator and local limits in the at least one degree of freedom, and a transfer function of a coordinate of the robotic manipulator in the at least one degree of freedom is assigned onto the input value;
  a control unit which configured to actuate the robotic manipulator in such a manner that at least one part of the robotic manipulator is manually movable by a user in the at least one degree of freedom assigned to the particular input device selected to be emulated and within the local limits assigned to the particular input device selected to be emulated;
  a sensor unit connected to the robotic manipulator, the sensor unit configured to record a respective coordinate in the at least one degree of freedom during or after completion of an input, the input performed by manual guiding on the part of a user on the robotic manipulator; and
wherein the control unit is configured to apply the transfer function to assign the respective coordinate to the input value.

According to an advantageous embodiment, the control unit for actuating the robotic manipulator is configured in such a manner that all the other parts of the robotic manipulator are blocked against manual guiding on the part of the user.

According to an additional advantageous embodiment, the control unit for actuating the robotic manipulator is configured in such a manner that at least a subset of the remaining parts of the robotic manipulator is enabled for the manual guiding on the part of the user.

According to an additional advantageous embodiment, the control unit for actuating the robotic manipulator is configured in such a manner that the at least one part of the robotic manipulator in the respective degree of freedom outputs a haptic feedback, wherein the haptic feedback is a resistance, wherein the resistance varies over a distance of the manual guiding, with respect to the force of the user during the manual guiding of the robotic manipulator.

According to an additional advantageous embodiment, the resistance has a local minimum where the current coordinate in the respective degree of freedom of the robotic manipulator coincides with a whole number of the result of application of the transfer function.

According to an additional advantageous embodiment, the sensor unit connected to the robotic manipulator is configured to continuously record the respective coordinate in the respective degree of freedom during the input performed by manual guiding on the part of a user on the robotic manipulator, and an optical output unit connected to the robotic manipulator, in particular, to the control unit of the robotic manipulator, is configured to output the input value in synchronization with the continuous recording of the respective coordinate.

Advantages and preferred developments of the proposed robotic manipulator result from an analogous and appropriate application of the explanations provided above in connection with the proposed method.

Additional advantages, features, and details result from the following description in which—possibly in reference to the drawings—at least one embodiment example is described in detail. Identical, similar, and/or functionally equivalent parts are provided with identical reference numerals.

BRIEF DESCRIPTION OF THE DRAWINGS

In the drawings:

FIG. 1 shows a robotic manipulator according to an embodiment example of the invention;

FIGS. 2A-2C show alternatives to the optical output of the input value according to an additional embodiment example of the invention.

Figure 3:
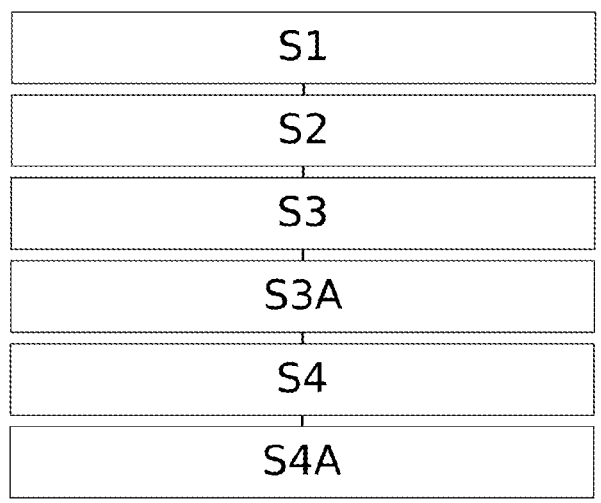
FIG. 3 shows a method for specifying an input value on a robotic manipulator according to an additional embodiment example of the invention.

The representations in the figures are diagrammatic and not true to scale.

DETAILED DESCRIPTION

FIG. 1 shows a robotic manipulator 1, wherein the robotic manipulator 1 includes a plurality of limbs which are connected to one another by articulations and which can be moved with respect to one another by actuation. The robotic manipulator 1 includes, by way of the computer connected to the robotic manipulator 1, a specification element 3 which is used for manually selecting a particular input device to be emulated from a plurality of predefined input devices to be emulated. Each of the input devices to be emulated is assigned at least one degree of freedom of the robotic manipulator 1, that is to say a movement possibility defined over a range, and local limits in the respective degree of freedom, and a transfer function of a coordinate of the robotic manipulator 1 in the degree of freedom is assigned onto the input value. Furthermore, the robotic manipulator 1 includes a control unit 5 which is configured to actuate the robotic manipulator 1 in such a manner that at least one part of the robotic manipulator 1 can be manually moved by a user in the respective degree of freedom assigned to the selected input device to be emulated and within the local limits assigned to the input device to be emulated. A sensor unit 7 designed as the totality of articulation angle sensors of the robotic manipulator is used for recording a respective coordinate in the respective degree of freedom after completion of an input performed by manual guiding on the part of the user on the robotic manipulator 1. Here, the control unit 5 assigns a respective coordinate to the input value by applying the transfer function. Since the input device, which is also represented in synchronization with the input of the user on the display unit 9, is a rotary switch which can be turned, on the robotic manipulator 1, a rotational degree of freedom is also enabled on the robotic manipulator. This rotational degree of freedom is located between the end effector and the distal limb of the robotic manipulator 1, on which the end effector is arranged.

FIGS. 2A-2C show multiple alternatives to the rotary switch shown in FIG. 1. Namely, in FIG. 2A, a sliding controller is shown, wherein the sliding controller can assume only a finite number of discrete values, so that, on the robotic manipulator 1, a haptic feedback is given, in which an artificial potential grid is specified, wherein the robotic manipulator 1 is automatically moved into one of the closest minima when the robotic manipulator 1 is released. On the other hand, in FIG. 2B, a continuous sliding controller is shown, which, in the context of numerical accuracy and quantized signals of the position sensors of the robotic manipulator in its articulations, can assume any numerical values as input values. On the other hand, in FIG. 2C, an alternative rotary controller is shown, which, like the sliding controller shown in FIG. 2A, can only assume a finite number of discrete values.

FIG. 3 shows the method of specifying an input value on a robotic manipulator 1, wherein the robotic manipulator 1 includes a plurality of limbs which are connected to one another by articulations and which can be moved with respect to one another by actuation, wherein the method includes:

selecting S1 a particular input device to be emulated from a plurality of predefined input devices by specification on the part of a user or by a control unit of the robotic manipulator 1, wherein each of the plurality of input devices to be emulated is assigned at least one degree of freedom of the robotic manipulator 1 and local limits in the at least one degree of freedom, and a transfer function of a coordinate of the robotic manipulator 1 in the at least one degree of freedom is assigned onto the input value;

actuating S2 the robotic manipulator 1 in such a manner that at least one part of the robotic manipulator 1 can be moved manually by a user in the at least one degree of freedom assigned to the selected input device to be emulated and within the local limits assigned to the input device to be emulated;

recording S3 a respective coordinate in the at least one degree of freedom during or after completion of an input, wherein the input is performed by manual guiding on the part of a user, on the robotic manipulator 1 via at least one sensor unit connected to the robotic manipulator 1;

continuously recording S3A the respective coordinate in the at least one degree of freedom;

applying the transfer function to assign S4 the respective coordinate to the input value, and outputting S4A the input value on an optical output unit in synchronization with the continuous recording of the respective coordinate.

Although the invention has been illustrated and explained in greater detail by preferred embodiment examples, the invention is not limited by the disclosed examples, and other variations can be derived therefrom by the person skilled in the art, without leaving the scope of protection of the invention. Therefore, it is clear that multiple variation possibilities exist. It is also clear that the embodiments mentioned by way of example in fact are only examples which in no way can be interpreted as limiting, for example, the scope of protection, the application possibilities or the configuration of the invention. Instead, the above description and the description of the figures enable the person skilled in the art to concretely implement the example embodiments, wherein the person skilled in the art, based on the knowledge of the disclosed inventive idea, can make numerous changes, in particular with regard to the function or the arrangement of individual elements mentioned in an example embodiment, without leaving the scope of protection defined by the claims and their legal equivalents such as, for example, further explanations in the description.

LIST OF REFERENCE NUMERALS

1 Robotic manipulator
3 Specification element
5 Control unit
7 Sensor unit
9 Output unit
S1 Selecting
S2 Actuating
S3 Recording
S3A Outputting
S4 Assigning
S4A Recording

The invention claimed is:

1. A method of specifying an input value on a robotic manipulator, wherein the robotic manipulator comprises a plurality of limbs connected to one another by articulations and movable with respect to one another by actuation, the method comprising:

selecting a particular input device to be emulated from a plurality of predefined input devices by specification on the part of a user or by a control unit of the robotic manipulator, wherein each of the plurality of input devices to be emulated is assigned at least one degree of freedom of the robotic manipulator and local limits in the at least one degree of freedom corresponding to each of the plurality if input devices, and a transfer function of a coordinate of the robotic manipulator in the at least one degree of freedom is assigned onto the input value;

actuating the robotic manipulator in such a manner that at least one part of the robotic manipulator is manually movable by a user in the at least one degree of freedom assigned to the particular input device selected to be emulated and within the local limits assigned to the particular input device selected to be emulated, wherein the particular input device selected to be emulated is a virtual physically existing device that has physical behavior imitated by the robot manipulator being manually moved by the user;

recording a respective coordinate in the at least one degree of freedom during or after completion of an input, the input performed via manual guiding on the robotic manipulator by the user, the respective coordinate recorded via at least one sensor unit connected to the robotic manipulator; and applying the transfer function to assign the respective coordinate to the input value associated with corresponding actuation of the particular input device selected to be emulated.

2. The method according to claim 1, wherein the actuation of the robotic manipulator occurs in such a manner that all remaining parts of the robotic manipulator are blocked against the manual guiding on the part of the user.

3. The method according to claim 1, wherein actuation of the robotic manipulator occurs in such a manner that at least a subset of remaining parts of the robotic manipulator is enabled for manual guiding on the part of the user.

4. The method according to claim 1, wherein the actuation of the robotic manipulator occurs in such a manner that at least one part of the robotic manipulator in the at least one degree of freedom outputs a haptic feedback, wherein the haptic feedback is a resistance, wherein the resistance varies over a distance of the manual guiding, with respect to a force of the user during the manual guiding of the robotic manipulator.

5. The method according to claim 4, wherein the resistance has a local minimum where the respective coordinate in the at least one degree of freedom of the robotic manipulator coincides with a whole number of a result from application of the transfer function.

6. The method according to claim 1, wherein the method further comprises:
continuously recording the respective coordinate in the at least one degree of freedom during the input performed by the manual guiding on the part of the user on the robotic manipulator via the at least one sensor unit connected to the robotic manipulator, and
outputting the input value on an optical output unit in synchronization with continuous recording of the respective coordinate via the control unit connected to the optical output unit.

7. The method according to claim 1, wherein the input device to be emulated is one of the following:
sliding controller;
rotary controller;
joystick; and
push button.

8. The method according to claim 1, wherein selection of the particular input device to be emulated occurs by performing and recording a haptic gesture executed by the user on the robotic manipulator.

9. The method according to claim 1, wherein selection of the particular input device to be emulated occurs by recording an input entered by the user on a touch-sensitive screen, wherein the touch-sensitive screen is arranged on the robotic manipulator or on a gripper arranged on the robotic manipulator.

10. A robotic manipulator comprising a plurality of limbs connected to one another by articulations and movable with respect to one another by actuation, the robotic manipulator comprising:
a specification element configured to select a particular input device to be emulated from a plurality of predefined input devices to be emulated, wherein each of the plurality of input devices to be emulated is assigned at least one degree of freedom of the robotic manipulator and local limits in the at least one degree of freedom corresponding to each of the plurality if input devices, and a transfer function of a coordinate of the robotic manipulator in the at least one degree of freedom is assigned onto the input value,
a control unit configured to actuate the robotic manipulator in such a manner that at least one part of the robotic manipulator is manually movable by a user in the at least one degree of freedom assigned to the particular input device selected to be emulated and within the local limits assigned to the particular input device selected to be emulated, wherein the particular input device selected to be emulated is a virtual physically existing device that has physical behavior imitated by the robot manipulator being manually moved by the user;
a sensor unit connected to the robotic manipulator, the sensor unit configured to record a respective coordinate in the at least one degree of freedom during or after completion of an input, the input performed by manual guiding on the robotic manipulator by a user; and
wherein the control unit is configured to apply the transfer function to assign the respective coordinate to the input value associated with corresponding actuation of the particular input device selected to be emulated.

11. The robotic manipulator according to claim 10, wherein actuation of the robotic manipulator occurs in such a manner that all remaining parts of the robotic manipulator are blocked against the manual guiding on the part of the user.

12. The robotic manipulator according to claim 10, wherein actuation of the robotic manipulator occurs in such a manner that at least a subset of remaining parts of the robotic manipulator is enabled for manual guiding on the part of the user.

13. The robotic manipulator according to claim 10, wherein the actuation of the robotic manipulator occurs in such a manner that at least one part of the robotic manipulator in the at least one degree of freedom outputs a haptic feedback, wherein the haptic feedback is a resistance, wherein the resistance varies over a distance of the manual guiding, with respect to a force of the user during the manual guiding of the robotic manipulator.

14. The robotic manipulator according to claim 13, wherein the resistance has a local minimum where the respective coordinate in the at least one degree of freedom of the robotic manipulator coincides with a whole number of a result from application of the transfer function.

15. The robotic manipulator according to claim 10, wherein:
the sensor unit is further configured to continuously record the respective coordinate in the at least one degree of freedom during the input performed by the manual guiding on the part of the user on the robotic manipulator, and
the control unit is further configured to output the input value on an optical output unit in synchronization with continuous recording of the coordinate.

16. The robotic manipulator according to claim 10, wherein the input device to be emulated is one of the following:
sliding controller;
rotary controller;
joystick; and
push button.

17. The robotic manipulator according to claim 10, wherein selection of the particular input device to be emulated occurs by performing and recording a haptic gesture executed by the user on the robotic manipulator.

18. The robotic manipulator according to claim 10, wherein selection of the particular input device to be emulated occurs by recording an input entered by the user on a touch-sensitive screen, wherein the touch-sensitive screen is arranged on the robotic manipulator or on a gripper arranged on the robotic manipulator.

\* \* \* \* \*